Sept. 15, 1936.   A. OBERHOFFKEN   2,054,760
MACHINE TOOL
Filed May 3, 1934   3 Sheets-Sheet 1

INVENTOR
Alexander Oberhoffken
By Chindall, Parker, Carlson
ATTORNEYS

Sept. 15, 1936.  A. OBERHOFFKEN  2,054,760
MACHINE TOOL
Filed May 3, 1934  3 Sheets-Sheet 2
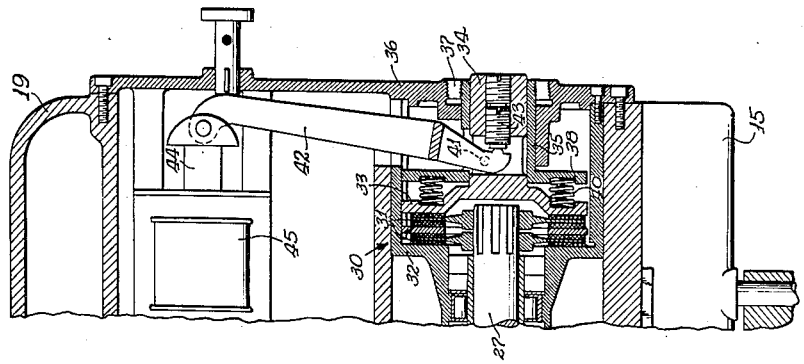
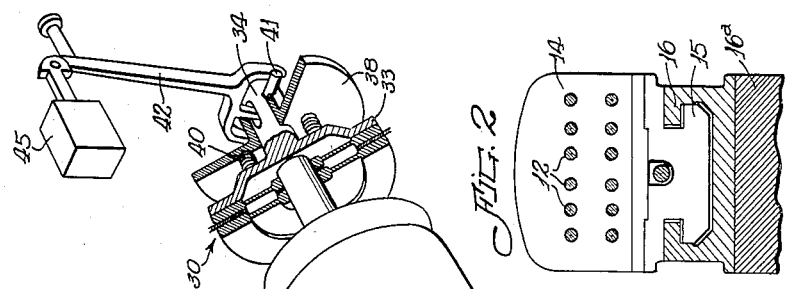
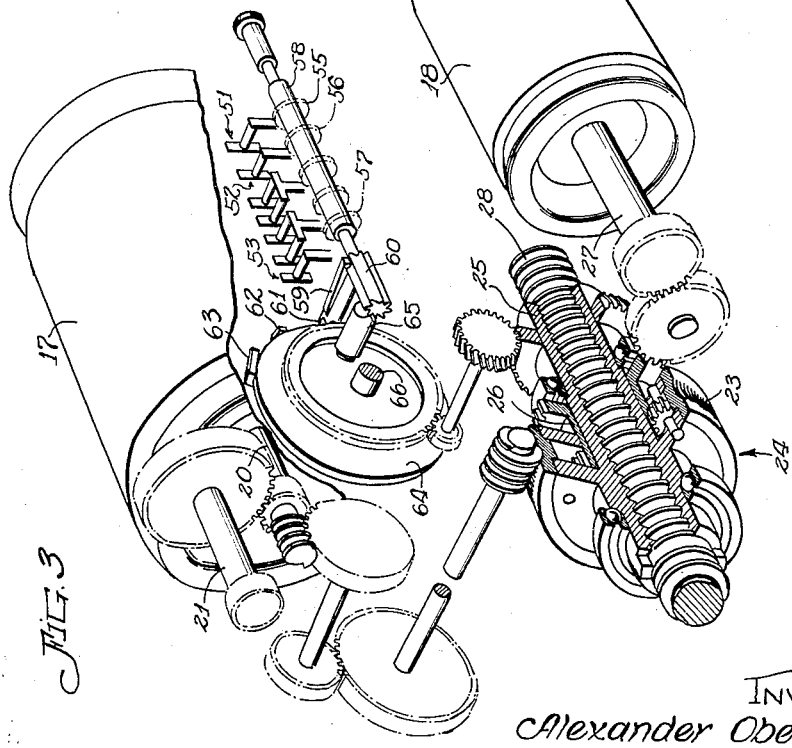
INVENTOR
Alexander Oberhoffken
By Lindahl, Parker & Carlson
ATTORNEYS Sept. 15, 1936.  A. OBERHOFFKEN  2,054,760
MACHINE TOOL
Filed May 3, 1934  3 Sheets-Sheet 3
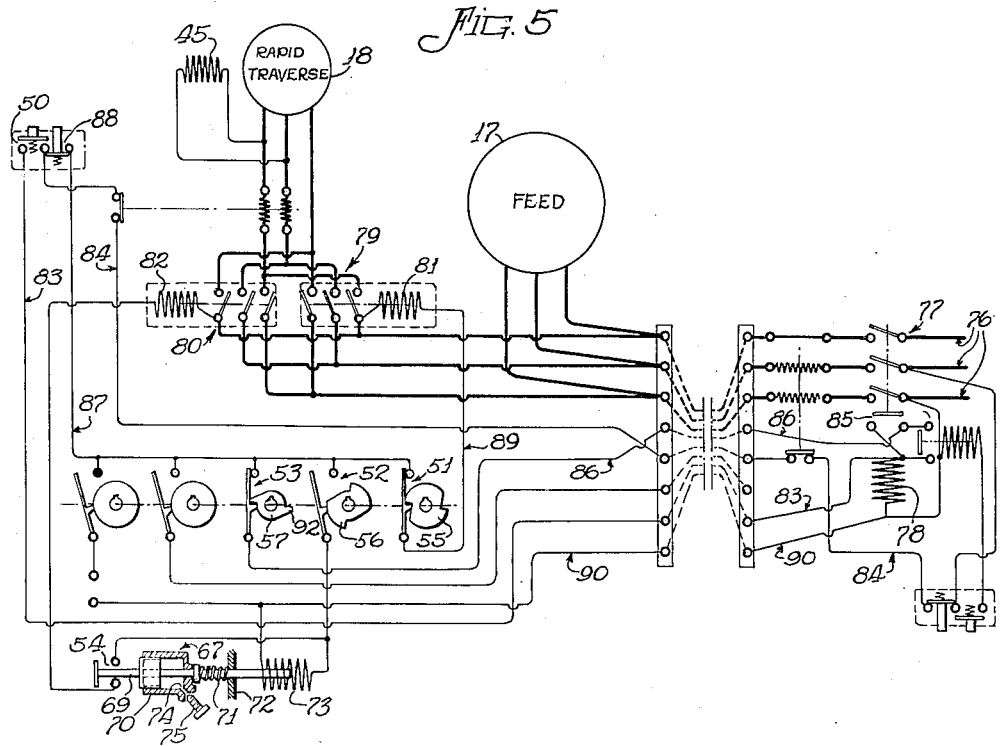
INVENTOR
Alexander Oberhoffken
By Lindell, Parker & Carlson
ATTORNEYS Patented Sept. 15, 1936

2,054,760

UNITED STATES PATENT OFFICE 2,054,760

MACHINE TOOL

Alexander Oberhoffken, Rockford, Ill., assignor to The Ingersoll Milling Machine Company, Rockford, Ill., a corporation of Illinois Application May 3, 1934, Serial No. 723,635

5 Claims. (Cl. 77—3)

This invention relates to a machine tool for performing so-called spot facing and allied metal-removing operations wherein the cutting tool enters the work to a depth determined by a positive stop, dwells for a brief interval during the facing operation, and then is retracted.

The primary object of the present invention is to provide novel control mechanism for enabling spot facing operations of the above character to be performed automatically in a machine tool in which the relative motions between the tool and work piece are produced by direct mechanical drive from an electric motor.

Another object is to provide a novel mechanism of the above character especially adapted for use in a machine tool wherein a cycle of feed and rapid traverse motions is defined by selective operation of two motors.

Another object is to provide a novel mechanism of the above character especially adapted for use in a machine tool wherein a cycle of feed and rapid traverse motions is defined by selective operation of two motors.

The invention also resides in the novel character of the means for initiating relative return movement in a machine tool of the above general character.

Other objects and advantages of the invention will become apparent from the following detailed description taken in connection with the accompanying drawings, in which Figure 1 is a fragmentary vertical cross-sectional view of a machine tool embodying the features of the present invention.

Fig. 2 is a section taken along the line 2—2 of Fig. 1.

Fig. 3 is a perspective view partially in section of the driving mechanism.

Fig. 4 is a fragmentary vertical section through the brake shown in Fig. 3.

Fig. 5 is a schematic view and wiring diagram of the control mechanism.

Figure 1:
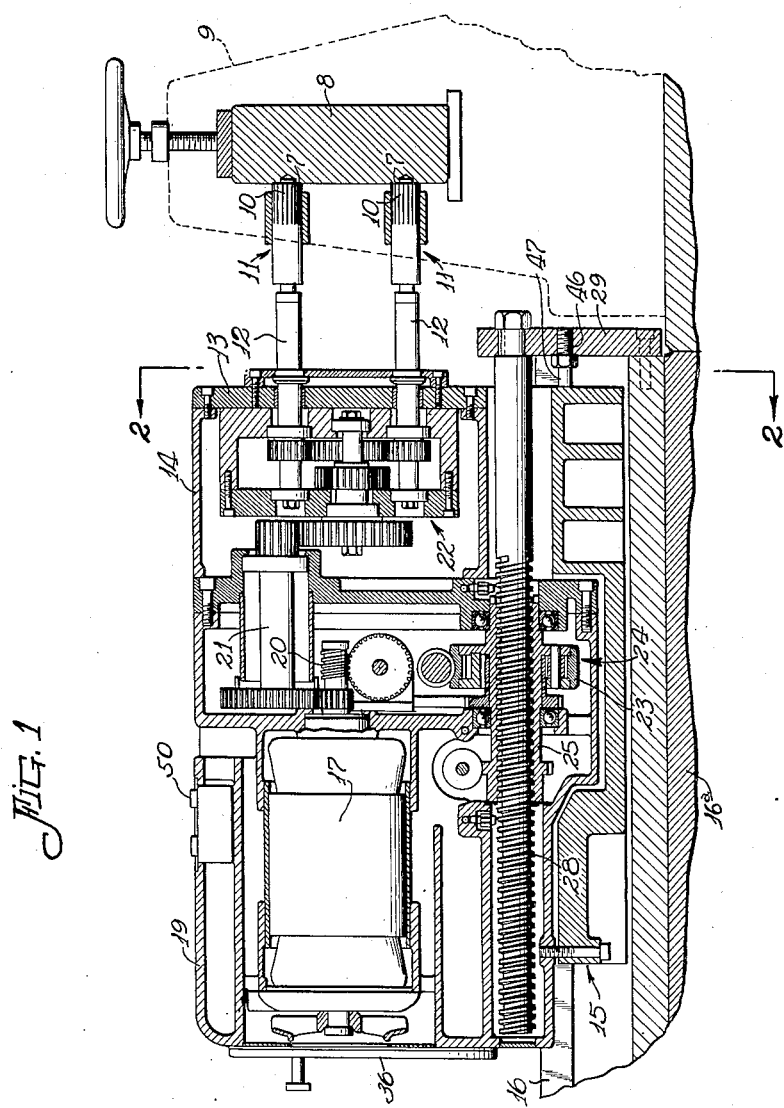

In the exemplary form shown in the drawings, the invention is embodied in a machine tool for spot facing circular areas 7 on a work piece 8 while the latter is stationarily clamped in a suitable fixture 9. The facing is effected by blades 10 projecting axially from rotary cutters 11 carried by spindles 12 which are rotatably mounted in the end wall 13 of a casing 14. The latter is secured to a saddle or carriage 15 slidable along ways 16 on a bed 16a to move the cutters bodily into and out of operative engagement with the work.

Power for rotating the tools and for advancing the saddle 15 toward and away from the work in an automatic cycle of feed and rapid traverse motions is supplied by two electric motors 17 and 18 supported by a housing 19 which is mounted on the saddle behind the casing 14. The motor 17 constitutes a combined tool driving and feed motor and its shaft 20 is connected to the spindles 12 through the medium of a shaft 21 detachably coupled within the casing 14 to speed-reduction gearing 22. The motor shaft is connected through spur and worm speed-reduction gearing to one drive member 23 of a differential gearing 24 by which the motions of the two motors are combined and imparted to a rotary feed element in the form of a nut 25 rotatably mounted in the lower part of the casing 19. The other drive member of the differential, which is a sleeve 26, is driven without appreciable speed-reduction from the shaft 27 of the motor 18 which is made reversible for the purpose of producing the rapid approach and rapid return movement of the saddle.

Threading through the nut 25 and projecting beneath the tool supporting casing 14 is a screw 28 which, in the embodiment shown in Fig. 1, is anchored at its forward end to a plate 29 rigid with the bed structure 17. The screw thus constitutes a stationary feed element and cooperates with the nut 25 to impart reciprocatory movements to the saddle 15 in a direction and at a speed determined by the combined movements of the motors.

During operation of the feed motor 17 alone, the shaft of the rapid traverse motor is held against rotation by a brake 30 (Figs. 3 and 4) having friction elements 31 rotatable with the motor shaft 27 and engageable with non-rotatable elements 32 and 33. The element 33 is in the form of a disk rigid with a shaft 34 which is mounted to slide endwise in a sleeve 35 supported in a cover plate 36 at the rear end of the casing 19 and shiftable axially of the sleeve by adjustment of a threaded bushing 37. Rigid with the sleeve 35 is a flange 38 which forms an abutment for compression springs 40 normally acting to urge the disk 33 in a direction to apply the brake.

Pivoted at 41 on the sleeve 35 is a lever 42 having a short arm bearing against and adjustable by a stop screw 43 threading into the shaft 34. The other arm of the lever is connected at its free end to the armature 44 of a solenoid 45 which when energized shifts the lever in a direction to retract the disk 33 and release the brake. The solenoid is arranged to be energized whenever the rapid traverse motor 18 is excited. It will be observed that by adjustment of the bushing 37 and the screw 43, the degree of braking action produced by the springs 40 may be varied as desired.

To define accurately the depth to which the cutter blades 10 may enter the work and thereby locate the machined areas 7 precisely relative to the work piece, an abutment is located in the path of the tool head to interrupt the movement thereof when the cutter blades have reached the proper depth. In the present instance, the abutment is in the form of a screw 46 threaded into the anchor plate 28 with its head 47 positioned for engagement with the forward end of the saddle 15. By adjustment of the screw, it will be observed that movement of the tool head may be interrupted at any desired point.

For the purpose of performing the facing operation, the tool head dwells while in engagement with the stop 46 and the cutters continue to rotate momentarily. To accomplish this, means interposed in the motion transmitting connection is adapted to yield under the excessive torque resulting from engagement of the stop and permit continued operation of the tool drive motor 17 while the saddle remains stationary. The friction brake 30 may be utilized conveniently to perform this additional function, and for this purpose, is adjusted as above described to slip when the torque transmitted thereto has increased to the desired degree. Thus, the brake holds the rapid traverse motor shaft against rotation during operation of the feed motor 17 until the saddle 15 strikes the stop 46 preventing further rotation of the nut 25. The full torque of the feed motor is then applied to the brake 30 through the medium of the differential gearing, continued operation of the feed motor being permitted by slippage of the brake.

The facing operation is preferably performed in an automatic cycle of motions comprising rapid approach of the tools toward the work, feed of the tools at a slow cutting rate until the stop 46 is encountered, dwell of the tool head while the cutters continue to rotate to face the areas 7, and rapid return of the tool head to starting position. Referring now to the exemplary circuit arrangement shown in Fig. 5, the cycle is initiated by manual closure of a starting switch 50 and the other motions are initiated and terminated automatically by control switches 51, 52, 53, and 54 which are actuated in response to movements of the tool head. The switches 51, 52, and 53 are operated by cams 55, 56, and 57 fast on a shaft 58 which is advanced unidirectionally with a step-by-step movement by a pawl 59 acting on a ratchet wheel 60 operated by dogs 61, 62, and 63 spaced around the periphery of a disk 64 according to the relative lengths of the different parts of the cycle. A spring pressed plunger 65 acting on the ratchet wheel completes each stepping movement of the ratchet wheel with a quick snap action. To render the dogs responsive to the movement of the tool head, the disk 64 is fast on a shaft 66 geared to the nut 25 as shown in Fig. 3.

The switch 54 is controlled by an adjustable timing device 67 which may take various forms and which, after being set in operation, operates independently of the movement of the tool head. The device is shown, for the purpose of illustration, as comprising a piston 68 having a rod 69 carrying the movable contact of the switch 54 and mounted to reciprocate in a cylinder 70. A spring 71 acting between the rod and an abutment 72 urges the piston in a direction to open the switch 54. Reverse movement of the piston is produced by energization of a solenoid 73 the armature of which is carried by the piston rod. To slow down the motion of the piston and thereby delay the closure of the switch for a predetermined interval of time following energization of the solenoid, the cylinder 70 is closed except for a small part 74 controlled by a manually adjustable needle valve 75. It will be seen that when the solenoid is energized, the air or other fluid within the cylinder will be compressed and will flow slowly out of the restricted outlet thereby permitting movement of the piston at a slow rate determined by the size of the outlet part.

In the circuit arrangement shown, current from the power lines 76 is applied to the feed motor 17 whenever the switches of a relay 77 are closed by energization of the relay winding 78. Closure of the relay switch also renders current available to the rapid traverse motor 18 which may be energized for operation in opposite directions according to which of two relay switches 79 and 80 is closed by energization of windings 81 and 82. The energizing circuit for the relay winding 78 extends from one power lead through the winding, a conductor 83, the starting switch 50, a conductor 84, to another power lead. Energization of the winding 78 also closes a maintaining circuit through a relay switch 85, a conductor 86, the switch 53, a conductor 87, a normally closed manually operable stop switch 88, and to the conductor 84. The circuit for the relay winding 81 extends from the conductor 87 through the switch 51 and a conductor 89, while the winding 82 is energized through a circuit extending from the conductor 87 through the switch 52, the solenoid coil 73, a conductor 90, to the power lead. The winding of the brake solenoid is connected directly across two of the power conductors leading from the relay switch 45 to the rapid traverse motor.

At the start of a cycle, the parts are positioned as shown in Figs. 3 and 5 with the switches 51 and 53 closed, the switches 52 and 54 held open, and the dog 61 in engagement with the ratchet pawl 59. When the switch 50 is closed, the winding 78 is energized and closure of the relay switch 77 applies current to the feed motor 17 and to the relay winding 81 which closes the switch 78 to energize the rapid traverse motor. The motors are thus started in directions to advance the tool head forwardly and thereby rapidly approach the tools to the work. As the dog 62 moves into operative engagement with the pawl 59, the cam shaft 58 is advanced through an eighth of a revolution during which the switch 51 is opened by the cam 55 to interrupt the operation of the rapid traverse motor. Advance of the tool head at the slow feed rate continues as the tools enter the work.

When the dog 63 is presented to the pawl 59, the cam shaft is advanced in its second step during which advance of the cam 56 allows the switch 52 to close which energizes the solenoid 73 and thereby initiates the operation of the timing device automatically as an incident to the forward movement of the head. Shortly after this advance of the cam shaft and while the pawl 59 is still held in advanced position by the dog 63, the saddle 15 encounters the stop 46 whereupon the motions of the tool head and the dog disk are arrested. The brake 30 begins to slip permitting continued rotation of the cutters by the feed motor 17, thereby performing the facing operation.

After the lapse of a brief time interval determined by the setting of the control valve 75, the switch 54 becomes closed thereby establishing the energizing circuit for the relay winding 82 which causes the switch 80 to be closed, energizing the solenoid 45 to release the brake and starting the motor 18 in a direction to return the tool head rapidly to starting position. As the dog 62 passes the pawl 59, the cam shaft 58 is advanced idly through one step without changing the condition of the switches. Finally when the dog 61 actuates the pawl, the cam shaft is advanced in its fourth step whereupon the switch 53 is opened momentarily by a lobe 92 on the cam 57 thereby interrupting the locking circuit for the relay winding 78, the cam shaft coming to rest with the switch 53 closed. Both motors are thus stopped with the maintaining circuit conditioned for starting of the next cycle. In the same movement of the cam shaft, the switch 52 is opened by the cam 56 and the switch 51 is closed, thereby conditioning the circuits for starting the rapid traverse motor in the proper direction in the next cycle. Upon deenergization of the solenoid 73, the spring 71 reconditions the timing device for the next cycle.

I claim as my invention:

1. An automatic machine tool comprising, in combination, a support for a work piece, a tool head having an electrically driven facing tool rotatably mounted thereon, a feed motor, a reversible rapid traverse motor, feed mechanism acting differentially to combine the motions of both of said motors and applying the same to said head to move the tool into and out of operative association with said work piece, a stop positioned to positively limit the movement of the tool head after the tool has entered the work piece to a predetermined depth, braking means normally holding the shaft of said rapid traverse motor against rotation when the feed motor alone is excited but yieldable under the torque applied by said feed motor after said head encounters said stop, and means controlling said motors to define an automatic cycle comprising rapid approach of said head toward the work, feed of the head into engagement with said stop, dwell of the head against the stop, and rapid return to starting position, said control means comprising a timing device operable to initiate operation of said rapid traverse motor to return the head after the lapse of a predetermined time interval, means responsive to the movements of said head and governing the operation of said motors to change from rapid approach to feed and to terminate the rapid return motion, and means also responsive to the forward movement of said head to initiate operation of said timing device.

2. An automatic machine tool comprising, in combination, a support for a work piece, a tool head having an electrically driven facing tool rotatably mounted thereon, two motors, a feed mechanism for reciprocating said head including differential gearing having driving elements driven by the respective motors, a stop positioned to positively limit the movement of the tool head after the tool has entered the work piece to a predetermined depth, means normally holding the shaft of one motor against rotation when the other motor alone is excited but yieldable under the torque applied by the latter motor after said head encounters said stop, and means controlling said motors to define an automatic cycle including feeding of the head into engagement with said stop, dwell of the head against the stop, and return to starting position, said control means comprising a timing device operable to initiate operation of said first mentioned motor to return the head after the lapse of a predetermined time interval, means responsive to the movements of said head to terminate the return motion, and means responsive to the forward movement of said head to initiate operation of said timing device.

3. An automatic machine tool comprising, in combination, a support for a work piece, a tool head having an electrically driven facing tool rotatably mounted thereon, a feed motor, a rapid traverse motor, feed mechanism acting differentially to combine the motions of both of said motors and applying the same to said head to move the tool into and out of operative association with said work piece, a stop positioned to positively limit the movement of the tool head after the tool has entered the work piece to a predetermined depth, a friction brake normally acting to hold the shaft of the rapid traverse motor against rotation when the feed motor alone is excited and adjusted to permit the shaft to turn under the torque applied thereto by the feed motor after engagement of said head with said stop, and automatic timing means operating independently of movement of said head and after the lapse of a time interval following abutment of said head and stop to initiate operation of said rapid traverse motor to cause rapid return movement of said head.

4. A machine tool having, in combination, a tool head having a facing tool rotatably mounted thereon, feed mechanism for imparting feed motions to said head including a rotary feed element, differential gearing having an intermediate driven member driving said element and two terminal members, an electric motor arranged to drive one of said terminal members, a stop positioned to positively limit movement of said head after the tool has entered a work piece to a predetermined depth, means acting frictionally on the other of said terminal members to hold such member normally against rotation but to yield and permit operation of said motor without rotation of said element under the torque applied by said motor after said head has encountered said stop, and an automatic timing means operating independently of the movements of said head and controlling said feed mechanism to initiate rapid return movement of the head after the lapse of a time interval following abutment of said head and stop.

5. An automatic machine tool comprising, in combination, a support for a work piece, a tool head having an electrically driven facing tool rotatably mounted thereon, a feed motor, a second motor, feed mechanism acting differentially to combine the motions of both of said motors and applying the same to said head to move the tool into and out of operative association with said work piece, a stop positioned to positively limit the movement of the tool head after the tool has entered the work piece to a predetermined depth, means normally acting to hold the shaft of said rapid traverse motor against rotation when the feed motor alone is excited but yieldable to permit the shaft to turn under the torque applied thereto by the feed motor after engagement of said head with said stop, and automatic timing means operating after the lapse of a time interval following abutment of said head and stop to control said motors and initiate rapid return movement of the head.

ALEXANDER OBERHOFFKEN.